United States Patent [19]

Lapeyre et al.

[11] Patent Number: 4,715,093
[45] Date of Patent: Dec. 29, 1987

[54] TRIMMING AND CUTTING APPARATUS FOR THE PREPARATION OF CRABS FOR MEAT EXTRACTION

[75] Inventors: George C. Lapeyre, New Orleans; Christopher G. Greve, Covington; Hendrik J. Ruys, New Orleans, all of La.

[73] Assignee: The Laitram Corporation, Harahan, La.

[21] Appl. No.: 776,453

[22] Filed: Sep. 16, 1985

[51] Int. Cl.⁴ ............................................. A22C 29/02
[52] U.S. Cl. ......................................................... 17/71
[58] Field of Search ..................................... 17/71, 48

[56] References Cited

U.S. PATENT DOCUMENTS

| 3,299,467 | 1/1967 | Hendrickson et al. | 17/71 |
| 4,479,284 | 10/1984 | Tolley et al. | 17/71 |
| 4,535,507 | 8/1985 | Reinke | 17/48 |

*Primary Examiner*—Willie G. Abercrombie
*Attorney, Agent, or Firm*—J. C. Kesterson

[57] ABSTRACT

Apparatus and method for preparing cooked crabs for further processing to separate meat from shell by centrifugal action is disclosed. The apparatus comprises a holding means (28), cooperating with a clamping means (190, 192) for securing a crab body (30) to a conveying means (20). The conveying means (20) moves the crab body (30) which has had the carapace shell removed along a predetermined path to a cutting means such as for example circular blades (50A-50D). The circular blades are supported and driven such that as the crab body is moved into the blades by conveying means (20), these blades make a "V" cross-sectional shape cut extending betwee the front and rear of the crab. The open or top of the "V" shape is located at the top or back of the crab and the "tip" of the "V" extends into the crab body such that the "tip" is proximate to but does not cut through the belly shell of the crab. Thus, a "V" cross-sectional portion (116) containing the viscera of the crab is removed from the crab body. In a preferred embodiment, another pair of circular blades removes the legs, claws and swimmerets. In addition, in the preferred embodiment, a brush means (56, 62) located proximate the predetermined path, detaches and removes gills and other loosely inedible attached parts of the crab such that the inner back shell of the crab is exposed. There is also a nozzle (68) for directing a stream of water (148) in the area of the cut to provide a final washing of the crab body.

16 Claims, 21 Drawing Figures

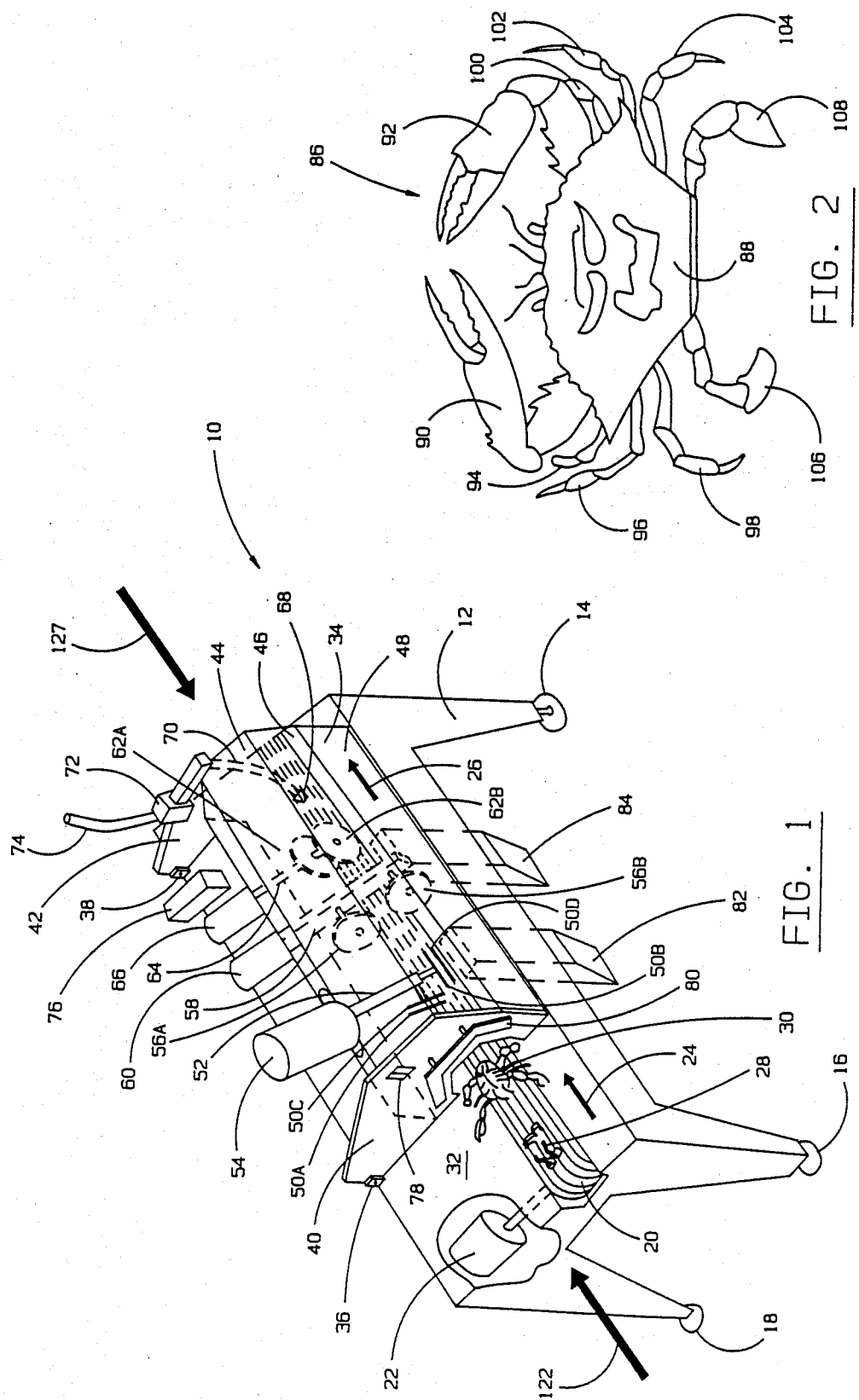

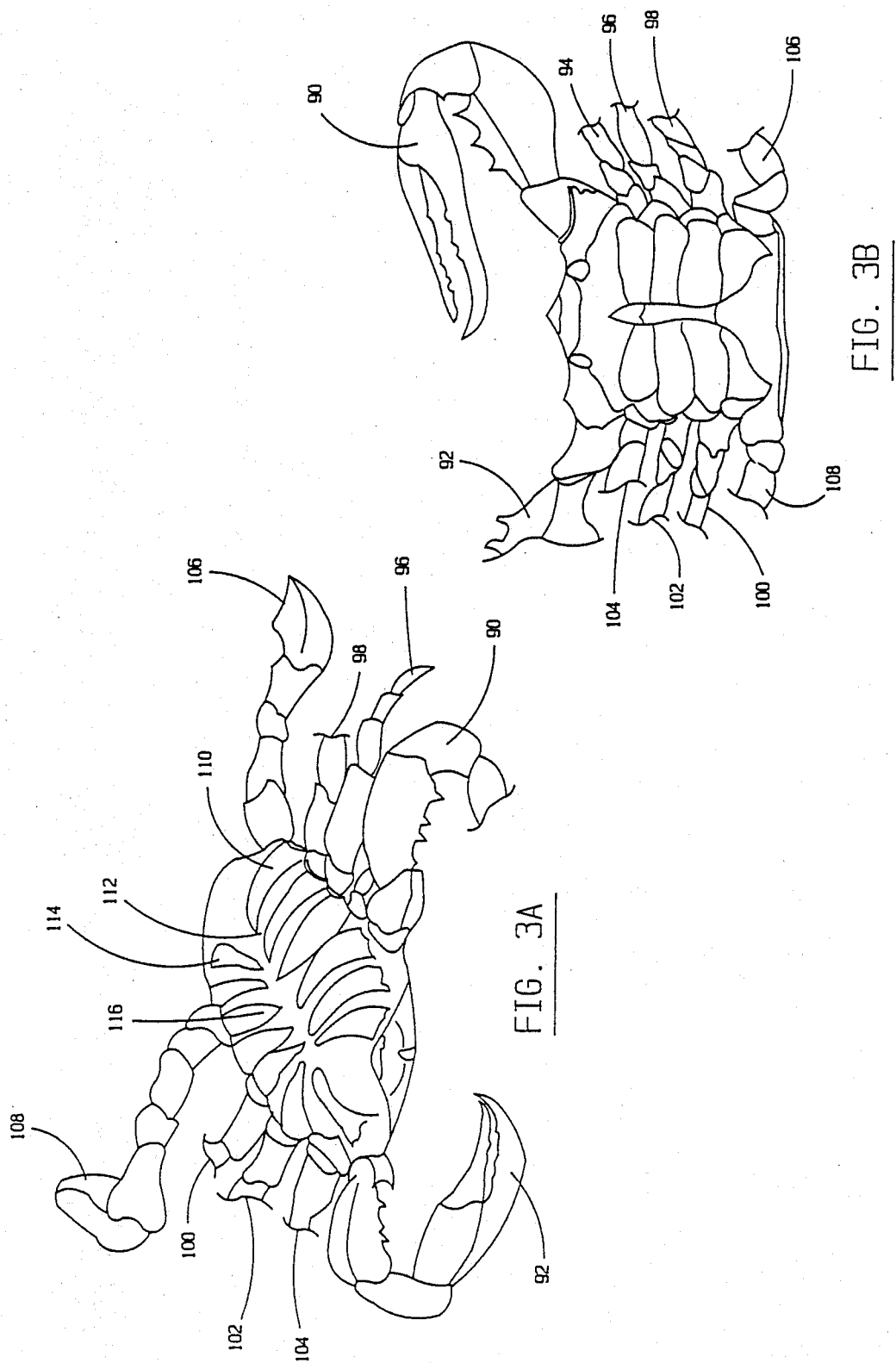

TRIMMING AND CUTTING APPARATUS FOR THE PREPARATION OF CRABS FOR MEAT EXTRACTION

TECHNICAL FIELD

This invention relates to apparatus and methods for trimming and cleaning hard shell crab bodies and more particularly to an improved apparatus for the preparation of crabs to facilitate the removal of the crab meat from the shell structure of the crab by centrifugal force. More specifically, the invention prepares cooked crabs by making a unique "V" shaped cut which both removes the viscera and opens up normally closed shell compartments to allow for centrifugal extraction of the crab meat. The tip of the "V" cut stops short of the strong belly shell thereby substantially maintaining the strength of the natural shell structure to substantially eliminate shell breakage and shell structure collapse due to high forces encountered during the centrifugal extraction of the crab meat. In addition, the apparatus described herein also uses a combination of unique brush arrangement to remove gills and other non-edible parts of the crab. The preparation of crabs by use of the machine of this invention in combination with unique apparatus for centrifugally extracting crab meat, such as disclosed in co-pending application (to be determined) and assigned to the same assignee as the present application, results in substantially all of the crab meat from all cavities of the shell structure of the crab being extracted during the process.

BACKGROUND ART

As will be appreciated by those skilled in the art, the removal of crab meat from the shell structure of the crab body is still primarily performed by hand whereby each crab is handled several times as the meat is extracted. As is well known, although great care may be taken during the hand-picking of the crab meat, much meat is left in the shell structure, and a great number of shell fragments also finds their way into the meat.

In the past numerous devices have been developed which attempted to solve the problem of removing crab meat from the shell structure of the crab. For example, it has been known in the past to use centrifugal or spinning of crab bodies so as to extract the crab meat. For example, U.S. Pat. No. 1,175,037 issued Mar. 14, 1916 is a very early example of such centrifugal spinning to remove crab meat. In that patent a centrifugal retainer is used which has semi-circular receiving pans or receptacles for the meat as well as supports or racks for holding the sections of the animal to be shelled. However, before any effective use of centrifugal action for removing crab meat from a shell can be made, it has been found that initial preparation of the crab is required. To this end, U.S. Pat. No. 2,522,578 entitled "Recovery Of Crab Meat" shows a coring machine which processes the crab by producing a crab body core by making a circular cut through the ventrical surface of the crab body to the meat and skeletal parts within the body. After removing the core from the crab the meat is extracted by centrifugal action. Another patent which cores and centrifugally removes crab meat is entitled "Apparatus For Recovery Of Crab Meat" and has U.S. Pat. No. 2,525,604. Still another U.S. Pat. No. 2,771,630 is entitled "Crab Meat Extractor". According to teachings of that patent, after coring a section of the crab body from the crab, the cored section is rotated about its axis in order to removed the crab meat.

However, such coring of crabs for preparation has been found to be unusual wasteful of the more valuable body meat of the crab, and also results in a still significant amount of shell being left with the meat.

In an attempt to solve the many problems of such coring as preparation of crabs, U.S. Pat. No. 3,611,478 discloses a system whereby the crabs are initially cooked and then the back shells removed. After removal of the back shells, the bodies are cleaned and the claws and arms removed by manual operation. The clean bodies are then placed in a body slicing apparatus which sliced the bodies in half while simultaneously removing the central longitudinal partition of the crab to expose many of the meat containing compartments. The body halves were then placed into a centrifugal extractor for removal of the crab meat.

The preparation of crabs by means of the U.S. Pat. No. 3,611,478 still required a great deal of manual labor. To further automate the process U.S. Pat. No. 4,503,586 which is assigned to the same assignee as the present application teaches apparatus and methods for processing hard shell crabs. According to this patent the crab bodies are initially engaged and aligned, and then carried along a predetermined path by a conveyor holding means which maintains the orientation of the crab bodies during their movement through the processing operation. Trimming means are mounted along the path of travel for severing the claws and legs, and cleaning brushes are provided for removing the gills and other inedible materials. However, similar to U.S. Pat. No. 3,611,478 discussed above, a slicer is provided for cutting the trimmed and cleaned bodies into half sections which removes the central portions of the body. Unfortunately, by cutting through the main belly shell and removing the central partition in this manner there is still some loss of central body meat and some fragmentation of shell structure.

Thus a review of the prior art patents for preparing crab bodies for centrifugal extraction of the meat reveals that to date there has not been a simple and inexpensive process which can both rapidly process the crab bodies with minimum handling and which does not cause fracturing of the shell structure, nor result in objectionable loss of central body meat. Therefore, it is an object of this invention to provide methods and apparatus of preparing crab bodies with minimum loss of the natural strength of the crab shell structure and with minimum loss of edible meat.

It is still another object of the present invention to remove and trim the legs, claws and swimmerets from the crab body by automatic means.

It is yet another object of the present invention to provide apparatus and methods for substantially removing all gills and other inedible material from the crab body without leaving shell fragments or causing damage to the shell structure of the crab body.

Other objects and advantages will be obvious, and will in part appear hereinafter, and will be accomplished by the present invention which provides for methods and apparatus for preparing cooked crab for further processing to separate meat from shell by centrifugal action. The methods and apparatus of this invention comprise means for holding and releasably securing a cooked crab body in a particular and selected orientation with respect to the securing or holding means. The holding means is moved along a predetermined path toward a cutting means by a conveying means to which the holding means is attached. The cutting means, such as a pair of circular blades, makes a "V" cross-sectional shaped cut in the crab body which extends between the front and the rear of the crab. The open or top of the "V" shaped cut is located at the top or back of the crab and the "tip" of the "V" extends into the crab body such that the tip is proximate to but does not cut through the belly shell of the crab. This "V" cut thereby separates a "V" cross-sectional shaped portion containing the viscera of the crab from the crab body. At the same time, the "V" shape further opens certain closed meat compartments of the crab body allowing even better meat extraction during centrifugal separating action.

In a preferred embodiment, there is a second set of circular blades one each of which is parallel to a blade of the first set for removing the legs, claws and swimmerets of the crab adjacent the body and through the knuckle of such members. In addition, the preferred embodiment further includes means for brushing away the lungs and other inedible portions of the crab as it moves along the predetermined path.

BRIEF DESCRIPTION OF THE DRAWINGS

The above features of the present invention will be more clearly understood from consideration of the following description in connection with the accompanying drawings in which;

FIG. 1 is a perspective view of the crab preparing apparatus of this invention.

FIG. 2 is a perspective view of a typical Gulf Coast Blue Crab still having the carapace shell intact and which may be prepared on the machine of this invention.

FIGS. 3A and 3B show a top perspective view and a bottom view respectively of the crab of FIG. 2 wherein the carapace shell has been removed.

BEST MODE FOR CARRYING OUT THE INVENTION

Figure 4A:
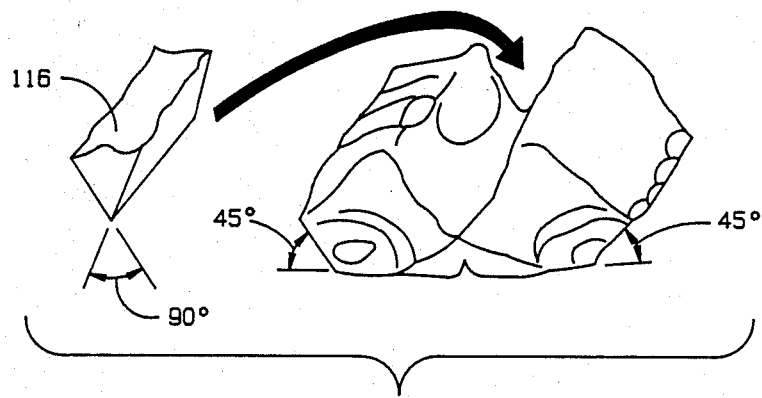
FIGS. 4A and 4B show a perspective top view and a bottom view respectively of the crab body of FIG. 3 after being prepared by the machine of this invention.

Referring now to FIG. 1 there is shown generally at 10 a perspective view of the apparatus of this invention for preparing crab bodies for centrifugal extraction of crab meat. As shown, there is a support table 12 having leveling pads such as shown at 14, 16 and 18. The apparatus includes a conveying means such as conveyor belt 20 driven by a driving means such as electrical motor 22. In the apparatus as shown, and during operation, the conveyor belt will move in a direction as indicated by arrows 24 and 26. There also is included a multiplicity of crab holding means such as for example crab holding means 28. It will be appreciated of course that these crab holding means such as the one holding the crab body 30 which has the carapace shell removed and which crab holding means is substantially hidden from view because of crab 30 are spaced substantially equal distance along the conveying belt such that a multiplicity of crabs can be processed at one time. Also as can be seen, the conveying means or belt 20 conveys the crabs horizontally and substantially in the same plane as the table top 32. A combination protective and support canopy 34 is hinged to table 32 by means of hinges 36 and 38 attached to canopy arms 40 and 42. Although it will be appreciated that the canopy 34 could be substantially any shape and made out of substantially any material sufficiently strong to support the cutting and brushing apparatus to be discussed hereinafter, it has been found that those portions of the canopy 34 not required to support the preparation machinery may preferably be made from a clear plexiglass material to allow viewing of the apparatus as the processing proceeds. For example in the embodiment shown, the structure has a semi-hexagon shaped cross-section, and panels 44, 46 and 48 are made of a transparent plexiglass material.

In the embodiment shown, there is included circular blades 50A, 50B, 50C and 50D attached to a gearing mechanism 52 which in turn is attached to drive motor 54. As can be seen the cutting blades 50A-50D are locate proximate the conveying belt 20 such that as the crab passes the cutting blades the appropriate cuts are made. Following the cutting blades, there is shown a first brushing apparatus including brushes 56A and 56B which are attached to gearing and drive shaft 58, and which in turn receive driving power from motor 60. In addition, there is a second set of brushes 62A and 62B having a different orientation than the previous brushes and which is driven by a shaft 64 receiving power from motor 66. Subsequent to the brushes, there is included a nozzle 68 connected by pipe or hose 70 to valving mechanism 72 outside of the canopy 34. Valving mechanism 72 is in turn connected to a clean water supply represented by hose 74. Suitable circuitry for controlling the various brushes and the cutting blades is shown by control box 76. In addition, there is shown a first OFF switch 78, and an emergency pressure plate OFF switch 80. Also as shown, chute 82 provides a passageway from the inside of the machine to the outside of the machine for the legs, claws and swimmerets. In a similar manner, chute 84 provides a passageway and means for disposing of the viscera, lungs, and other inedible parts removed from the crab body during the brushing process.

Referring now to FIG. 2, there is shown a perspective view of a typical Gul Coast Blue Crab which is suitable for processing by the methods and apparatus of this invention. As shown, the crab shown generally at 86 still has its hard outside back carapace shell 88 intact. In addition the crab has the normal compliment of two claws 90 and 92, six legs 94, 96, 98, 100, 102 and 104, and two simmerets 106 and 108. Although the crab shown in FIG. 2 is a "Blue" crab which may be found in the Gulf Coast and the Chesapeake Bay area as well as other areas, and although the presentation of prepared crabs and unprepared crab bodies hereinafter illustrate the Blue Crab, it will be appreciated that other species and varieties of crab may well be prepared by use of the present machine. Particularly other suitable crabs include but are not limited to the King, Dungeness, Alaskan Tanner, European Edible, Canadian Queen Crab and Jonah Crab. It is believed that the only necessary change for different species of crabs will be in the setting and dimensioning of the blade locations and the various brushes. Once these dimensions are set for a particular species of crabs, it has been found that significant variations in the size of the crab processed by the machine of this invention may be tolerated with excellent results. It will, however, be appreciated that extreme variations in size of the same species of crabs being processed may require some readjustment of blade and brush settings.

Referring now to FIG. 3A and 3B there is shown a top perspective and belly or bottom view of a typical Blue Crab of the type shown in FIG. 2, which has had the main carapace shell removed. As can be seen, however, the claws 90 and 92; and the legs 94–104 as well as the swimmerets 106 and 108 are still present on the crab. However, as can be seen, the removal of the carapace shell reveals the lungs and/or gills of the crab such as indicated by 110, 112 and 114 which lie between the main or carapace back shell and the inner back shell. In addition, the viscera portion 116 of the crab is also visible.

Figure 4B:
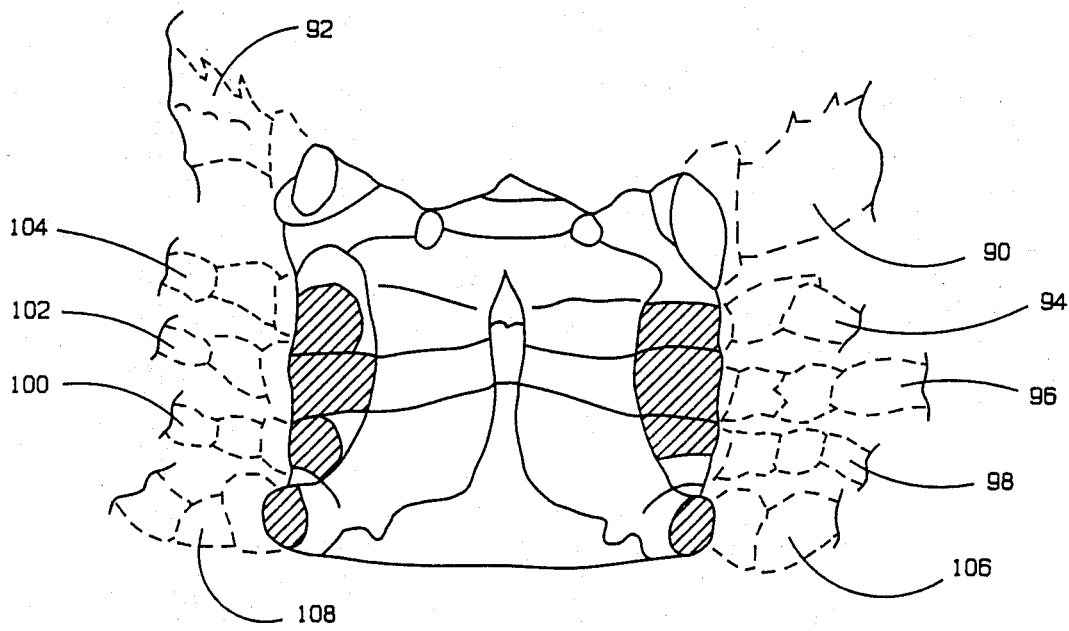

Now referring to FIGS. 4A and 4B, there is shown a top perspective view and a bottom or belly view of the crab of FIG. 3A and 3B after being processed by the process and apparatus of this invention. As can be clearly seen, the viscera portion 116 has been removed as a "V" section from the center of the crab. In addition, all the gills of the crab have also been removed exposing the inner back shell 118 and 120, as have the legs swimmerets and claws. Thus, it will be appreciated that a crab prepared in this method is well suited for centrifugal extraction of the meat from the shell structure. Of particular note, however is the fact that the legs, swimmerets and claws of the crab have been removed at an angle and extremely close to the body of the crab. As shown, the cut either cuts completely through the attaching knuckle of the legs or is even closer and actually cuts partially into the crab body itself as shown more clearly in FIG. 4B. By removing the legs, claws and swimmerets of the crab so very close to the body, the attaching membranes and structures are also removed such that when centrifugal forces are applied to the remaining crab body, the meat is more readily extracted without wasting small portions of meat which otherwise are commonly left in the knuckles.

Figure 5:
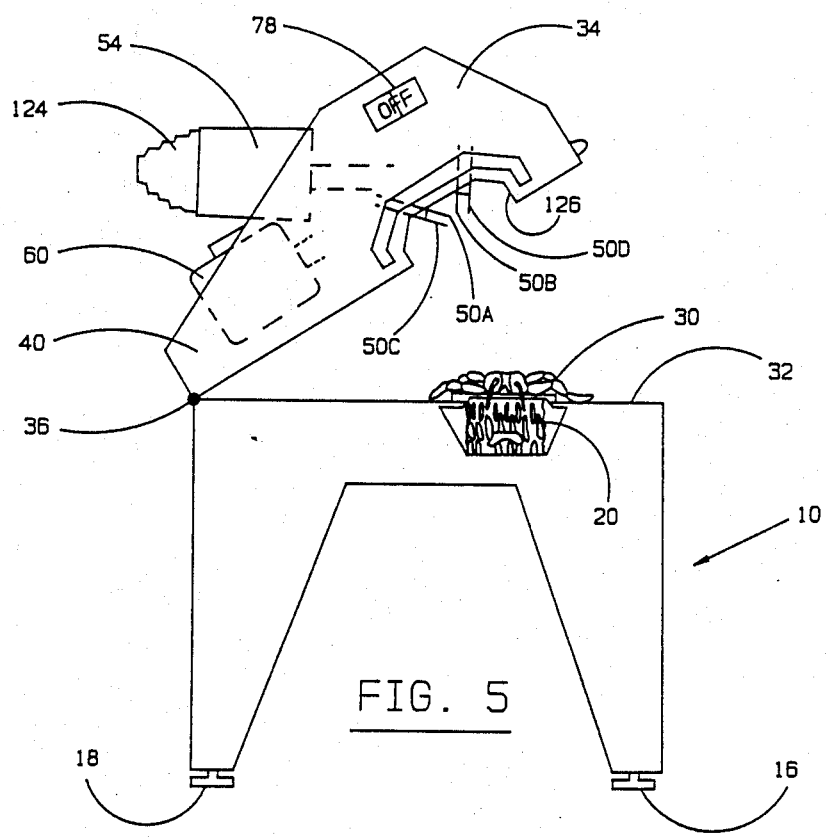
FIG. 5 shows a front end view of the machine of FIG. 1.

Referring now to FIG. 5, there is shown a front end view as indicated by heavy arrow 122 of the machine shown in FIG. 1. It will be appreciated, that elements of FIG. 5 which are common to those elements of FIG. 1 will carry the same reference number. As can also be seen, the canopy 34 shown in FIG. 1 has been moved to the open position in FIG. 5. Details which are more clearly seen in FIG. 5 over and above those seen in FIG. 1 indicate that the motor 54 which supplies power to the blades 50A, 50B, 50C and 50D will preferably include an automatic braking means to stop the blades immediately in an emergency situation. In the embodiment shown in FIG. 5, the braking means is built into motor 54 and is indicated by the truncated trapezoidal section 124. Also more clearly seen is the emergency guard plate switch 80. As can better be seen, in this figure, if in an emergency situation an opeator's hand or arm were to somehow be pulled along the conveyor belt 20 toward the cutting blades, any pressure on plateswitch 80 will immediately stop all blades, the conveyor belt and the brushes in the machine. Thus, if anything larger than the opening 126 in support arm 40 was attempted to be carried toward the blades, contact with emergency plate switch 80 would be realized and the equipment immediately stopped.

Figure 6:
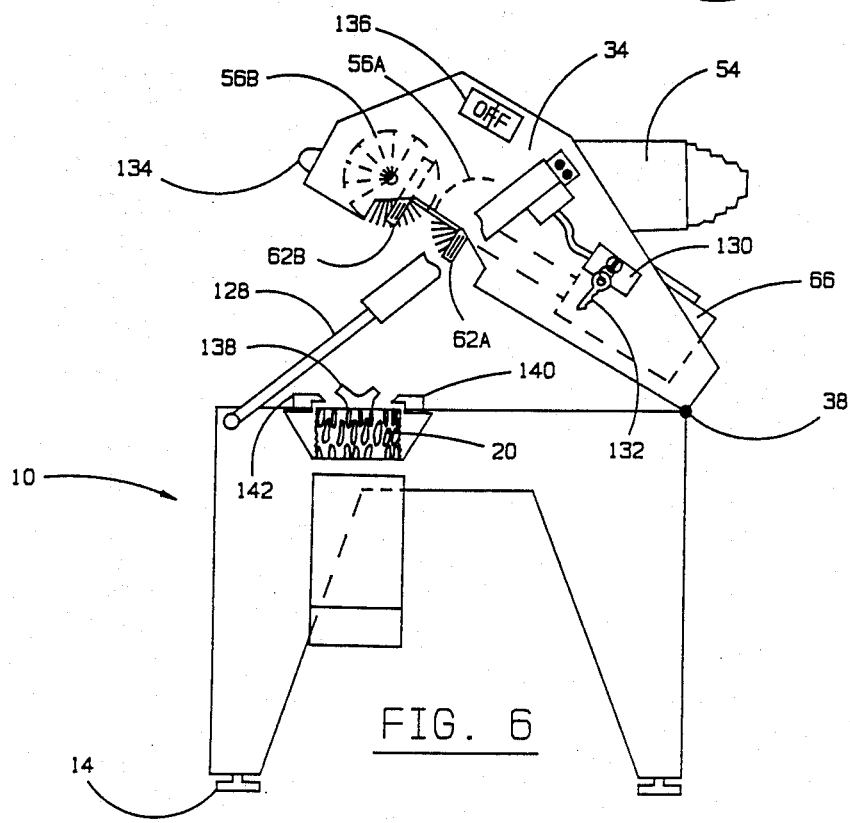
FIG. 6 shows a rear end view of the machine of FIG. 1.

Referring now to the end view section of FIG. 6, as indicated by heaavy arrow 127 it can more clearly be seen that the conveyor belt extends the full length of the machine. Also as shown in the end view of FIG. 6, there is an electrical opening piston and mechanism 128 which is operated by a safety key switch 130. Thus, it is impossible to open the machine without using a key 132 for key switch 130 or dismantling the opening mechanism 128. For convenience, a handle 134 is also shown. In addition to the Off switch 78 and the emergency plate switch 80, there is still another Off switch 136 located at the rear end of the machine such that an operator from that end may also immediately stop all motors on the machine.

FIG. 6 also shows a clearer view of a holder 138 mounted on conveyor belt 20. As will be discussed in more detail hereinafter, all holders such as holder 138 are securely mounted to the belt 20 such that there is no lateral movement between the two. In addition, there are shown guide rails 140 and 142 which provide close alignment of conveyor belt 20 as it moves along its predetermined path. It will be appreciated that such guide rails 140 and 142 are most helpful in maintaining the conveyor belt 20 in a particular location as it moves thereby preventing contact of the holder 138 with the blades as the holder holding the crab passes by such blades.

Figure 7:
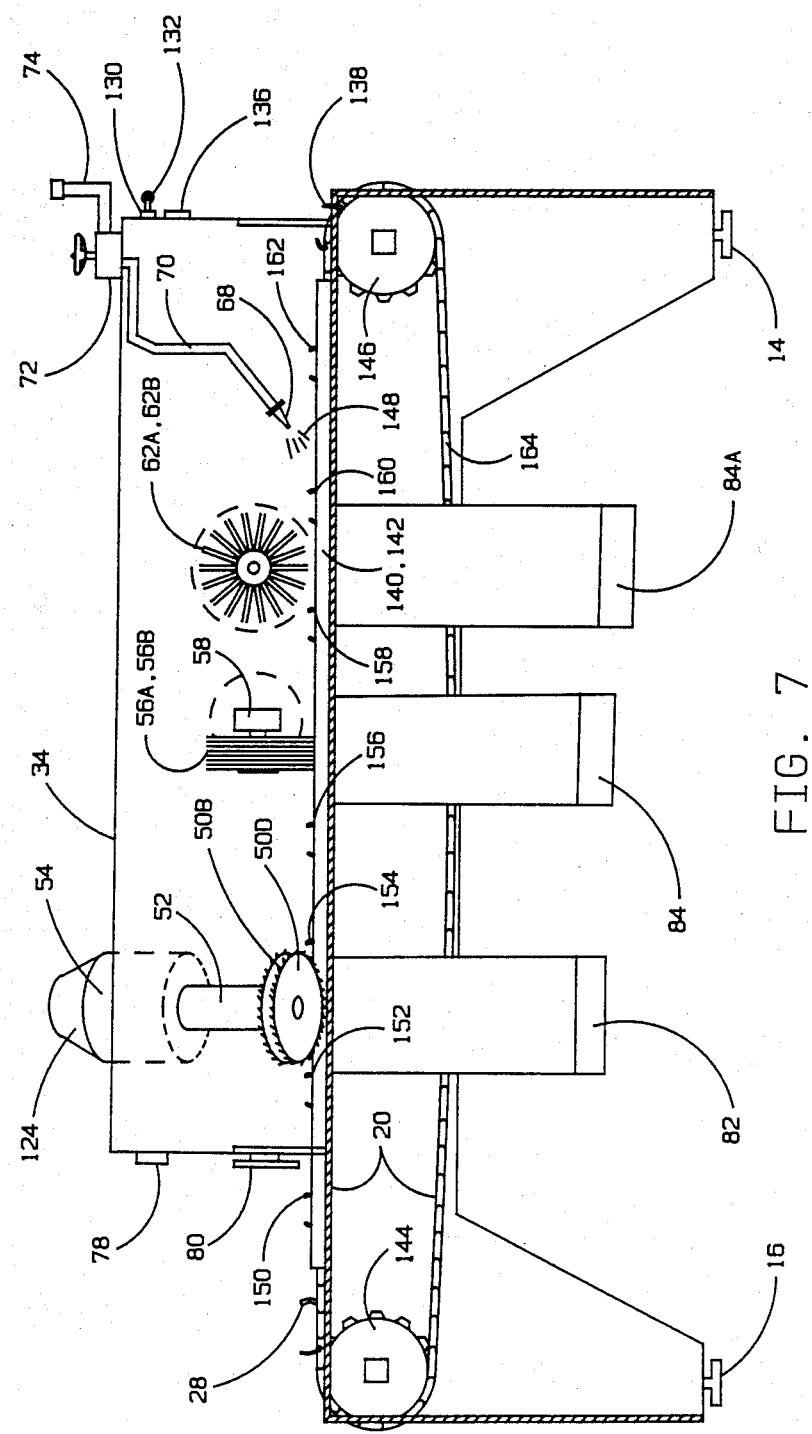
FIG. 7 shows a side cross-sectional view of the machine of FIG. 1.

The cross-sectional side view of FIG. 7 when considered in combination with the figures of the machine previously discussed, more clearly illustrates operation of the apparatus. As can be seen, conveyor belt 20 is driven by a sprocket 144 which is attached to the motor 22 previously discussed. At the other end of the conveyor belt there is a second sprocket 146 to provide further support and alignment of the belt. Also as can be seen, guard rails 140 and 142 run substantially the full length of the conveyor belt as it passes through the canopy 34. In addition, it can be seen that water spray 148 from nozzle 68 provides a final washing of the crab body after it has passed both the blades and the brush assemblies. As also can better be seen, in addition to the holding means 28 and 138 previously discussed there can be seen the multiplicity of crab holding means such as means 150, 152, 154, 156, 158, 160 and 162. In addition to these crab holding means on the top side of conveyor belt 20, there will be a similar number of holders on the bottom side 164 of conveyor belt 20 not show. Also as shown, instead of the two exhaust chutes 82 and 84 previously discussed, it may also be desirable to include even more chutes such as chute 84A to transport portions of the crab which has been cleaned away by the blades or brushes from the inside of the machine. By using more such chutes, it will be possible to separate the various portions of the crab as they are removed. Thus, such things as claws which contain considerable amounts of edible meat and the legs which maybe used in gumbos and for making soups and the like may be easily separated completely from the nonedible portions such as the viscera, lungs, gill and such.

Figure 8A:
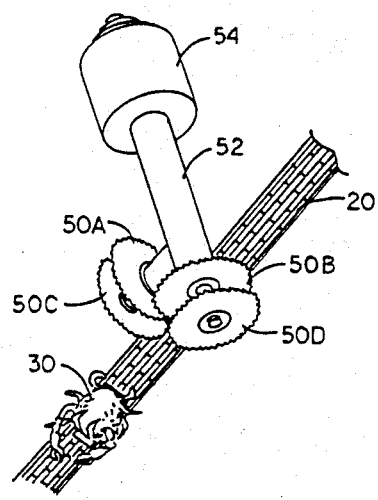
FIGS. 8A and 8B show a top perspective and a side view respectively of the cutting and trimming blades used in the apparatus of this invention.
Figure 8B:
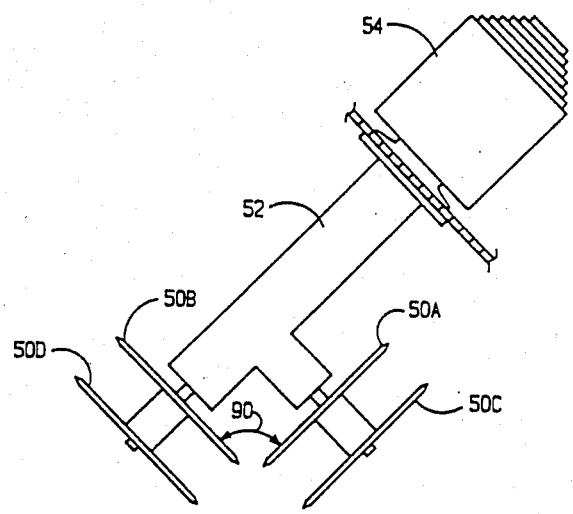

Referring now to FIGS. 8A and 8B, there is shown details of the blades for cutting the claws of the crab from the body and the "V" shape viscera section. As can be seen clearly in FIG. 8B, the inside blades 50A and 50B are shown to be at substantially 90° with respect to each other. Thus, the "V" shape viscera section will have a 90° angle. It has been found that the 90° angle follows the natural contours of the Blue crab quite closely, and of course provides a simple mechanism for joining the blade drive shafts to a common gearing box 52. In a similar means, by putting outside blades 50C and 50D on the same shaft as their companion inside blades, the legs, claws and swimmeretts may also be readily removed. Thus, the blades are easily and more efficiently driven. However, although it has been found that use of a 90° angle with respect to companion blades 50A and 50B as well as companion blades 50C and 50D provides excellent results in working with Blue Crab, it should be understood that other "V" shaped cuts will also provide satisfactory results for Blue Crabs, and that for other species of crabs, different "V" shaped angles may be preferable. Thus it will be appreciated that although in the embodiment shown in FIG. 8A and 8B a single drive mechanism is used to drive both companion blades 50A and 50B at the same time as it drives blades 50C and 50D, processing of other species of crabs and to achieve minimum loss of meat may require locating blades 50C and 50D at a different angle from that of 50A and 50B, and therefore may require a second blade driving mechanism.

Figure 9:
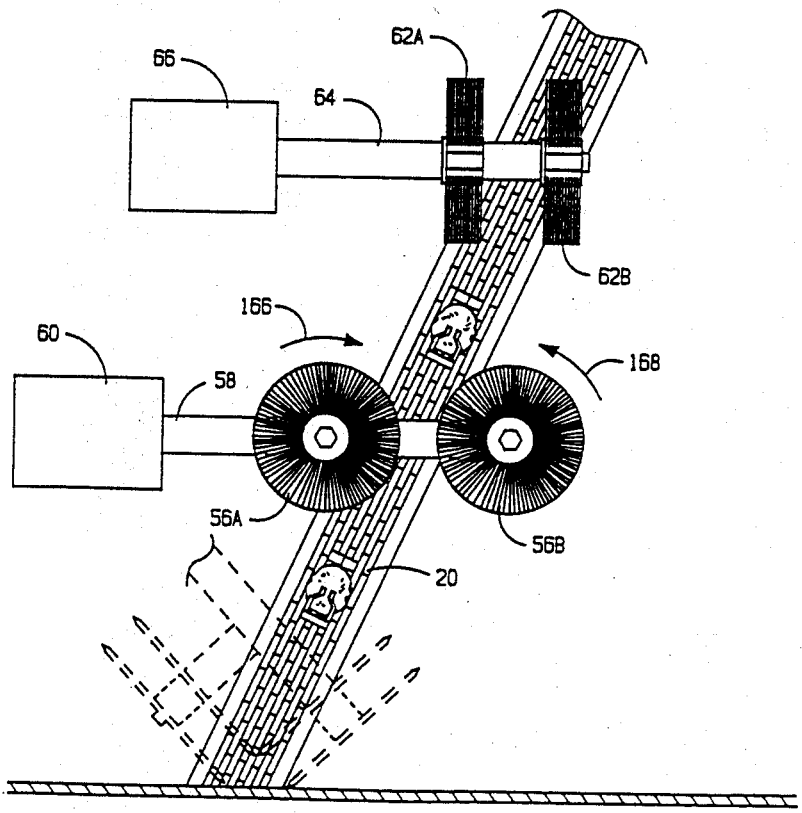
FIG. 9 shows one embodiment of brush arrangements used in the present invention.
Figure 10:
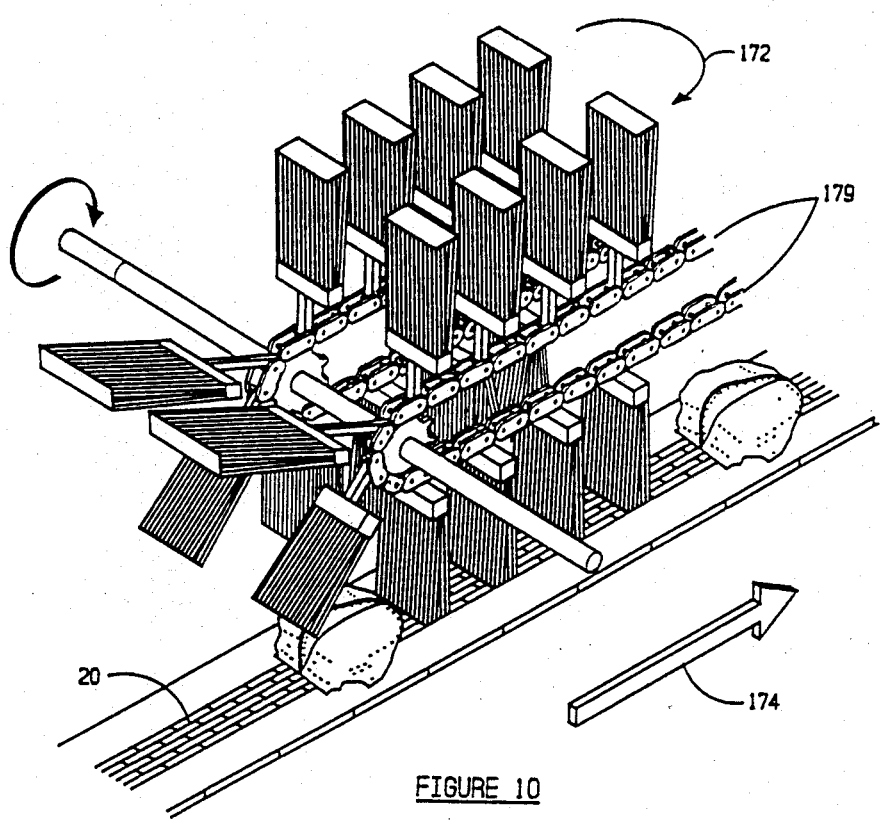
FIG. 10 shows an alternate embodiment of brush arrangements for use with the machine of this invention.

Referring now to FIG. 9, there is shown the brush arrangement for removing the gills, lungs and any remaining inedible portions of the crab after passing through the cutting stage. As shown, the first set of brushes 56A and 56B rotate in opposite directions as indicated by arrows 166 and 168 and in such a manner that the brushes are rotating down and away from the crab body as it contacts the edge of the crab body where the gills and lungs are attached. Apparatus using only brushes 56 and 50A has had satisfactory test results, however it has been found that when a second set of brushes 62A and 62B which are oriented to brush the gills and lungs in direction perpendicular to that brushed by brushes 56 and 56B even better cleaning and removal of the gills and lungs is achieved. Thus, in the preferred embodiment shown two sets of brushes are shown although depending upon the species of crab being cleaned one set of brushes of either arrangement shown in FIG. 9 may be suitable. In addition to the circular type brush structure shown in FIG. 9, it has also been found that brushes mounted to a conveyor chain such as conveyor chain 170 may also provide satisfactory results in removing gills and lungs from the crab body. Again, although the brush structure shown in FIG. 10 does provide excellent results in cleaning the gills and lungs from certain species of crab bodies, the more simple structure and use of circular brush as shown in FIG. 9 is believed to be preferable. As shown in FIG. 10, the brushes move in a direction indicated by arrow 172, as the conveyor belt is moving the crabs in the direction indicated by dark and heavy arrow 174.

Figure 11:
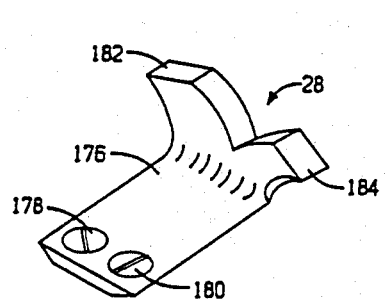
FIGS. 11 and 12 show a perspective front view and an end view respectively of the holding means of the apparatus used in this invention.
Figure 12:
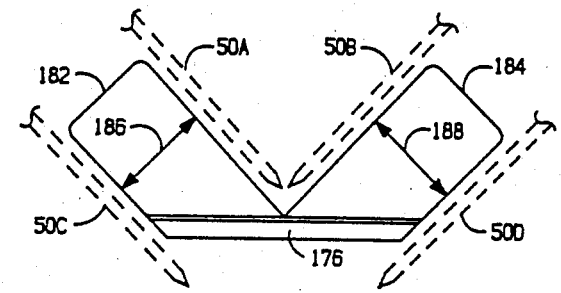

Referring now to FIG. 11 and FIG. 12, there is shown a perspective view and an end view respectively of the crab holding means such as crab holding means 28 shown in FIGS. 1 and 7. As shown, crab holding means 28 includes a plate portion 176 by which the complete holder 28 may be mounted to the conveyor belt 20 by nuts and bolts indicated by flat-headed bolts 178 and 180. In the embodiment shown, holder 28 includes 2 horns 182 and 184 which curve up from base plate 176 and provide a cup area for receiving the crab being processed. In the embodiment shown and as can be more clearly seen in FIG. 12, horns 182 and 184 curve up and around at a 90° angle with respect to each other. In addition, the thickness of horns 182 and 184 is selected to have a thickness as indicated by arrows 186 and 188 somewhat less than the spacing between the pair of blades 50A and 50C, and 50B and 50D. Thus, it will be appreciated that as the conveyor belt moves holder 28 along its predetermined path, the horns 182 and 184 will freely pass between the cutting blades without being touched by such blades whereas any portion of the crab such as the viscera portion and the legs will contact the blades thus providing the necessary preparation.

Figure 13:
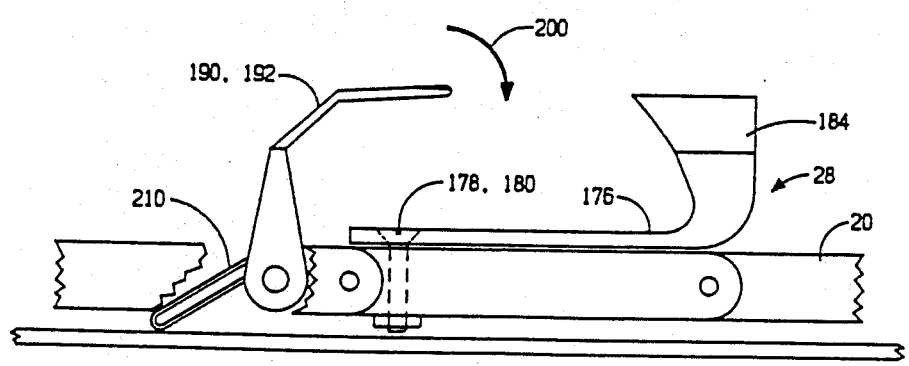
FIG. 13 shows a side view of the holding means in combination with spring-loaded retaining means.

Also referring to FIG. 13 there is shown a side view of the crab holding means 28 in combination with the spring-loaded clamping means discussed below.

Figure 14:
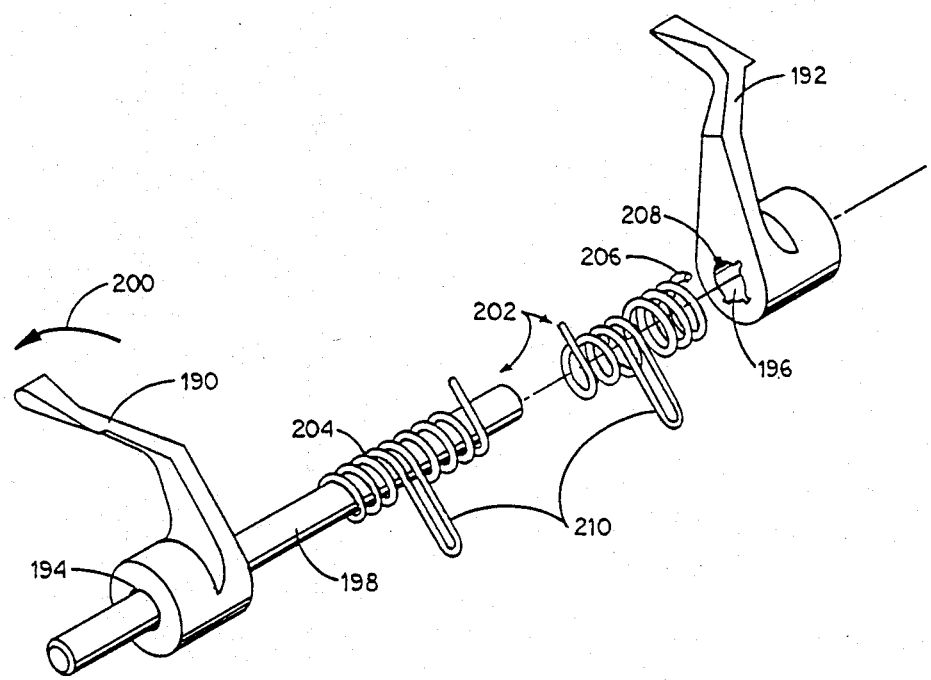
FIG. 14 shows an exploded view of the retaining means used in combination with the holding means of FIG. 13.
Figure 15A:
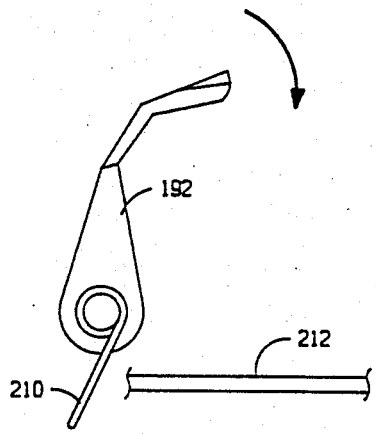
FIGS. 15A and 15B show a side and end view respectively of the spring-loaded clamping means of FIG. 14 in an non-clamping position.
Figure 15B:
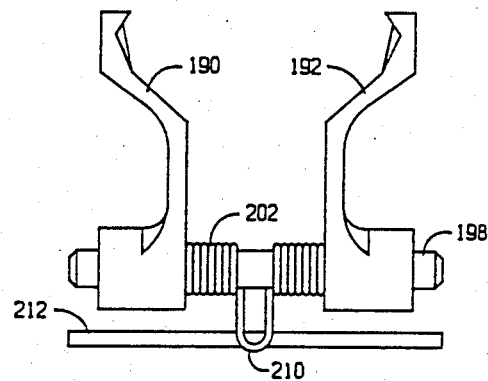
Figure 16A:
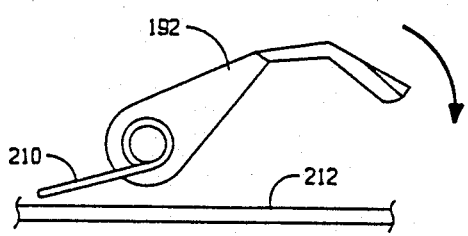
FIGS. 16A and 16B show a side and end view respectively of the clamping apparatus of FIG. 14 in a clamping position.
Figure 16B:
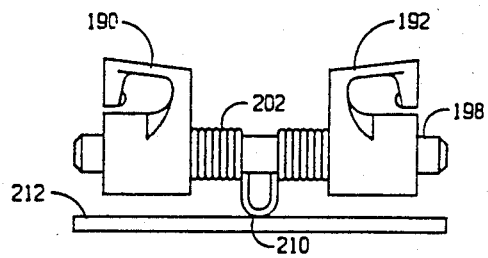

Referring to FIG. 14, it can be seen that the spring-loaded clamping means includes a pair of clamping arms 190 and 192 having apertures 194 and 196 which pivot around pivot axis or rod 198. To provide the clamping action in the direction indicated by arrow 200, there is also included a spring means such as springs 202 which have locating arms 204 and 206 received by slots in the arms 190 and 192 such as slot 208 shown in arm 190. In addition, springs 202 also include a cam member 210. As can be more readily seen in FIG. 13 and FIGS. 15A, 15B, 16A and 16B, which shows another spring arrangement using a single spring, cam member 210 will contact plate member 212 to resiliently urge the arms 190 and 192 in the clamping direction. Thus, it will be appreciated that prior to the crab holding means 28 moving under canopy 34 by means of port 126 in support arm 40, the clamping arms 192 and 190 will be in the open position as indicated in FIGS. 15A and 15B. At this time, the crab is placed under the horns 182 and 184 of holding means 176. As the conveyor belt 20 moves the crab and the crab holding means along, the cam member 210 will contact the plate 212 thereby resiliently urging the clamping arms 190 and 192 forward and drawn against the crab body inner back shell thereby retaining the crab body in position. This clamping force is maintained on the crab body until the crab moves from under the canopy at the opposite end of the cutting apparatus. At that time, the cam member 210 of the spring 202 will no longer encounter the plate 212 thereby releasing the resilient action and also allowing the crab to tumble from the holding means 28 as it rounds sprocket 146. It is important to realize, that it is desirable to have the resilient action of clamping members 190 and 192 to accommodate crabs of different sizes.

Thus, although there has been described to this point particular embodiments of the method and apparatus for trimming and preparing crab bodies for subsequent use in centrifugal extracting apparatus, it is not intended that such references be considered as limitations upon the scope of this invention, except insofar as set forth in the following claims.

We claim:

1. Apparatus for preparing cooked crabs for further processing to separate meat from shell by centrifugal action comprising:

holding means for releasably securing a cooked crab body which has had the carapace shell removed in a selected orientation with respect to said holding means;

conveying means for moving said holding means securing such a crab body along a predetermined path and proximate a cutting means; and a cutting means for making a "V" cross-sectional shaped cut extending between the front and rear of the crab, the open or top if said "V" shape located at the top or back of the crab and a "tip" of the "V" extending into the crab body substantially parallel to the center line of the crab body such that said "tip" of said "V" is proximate to but does not cut through the belly shell of such a crab thereby separating a "V" cross-sectional shaped portion containing the viscera from said crab body while maintaining the structural integrity of said belly shell such that such crab body is not divided into two pieces.

2. Apparatus for preparing cooked crabs for further processing to separate meat from shell by centrifugal action comprising:

holding means for releaseably securing a cooked crab body in a selected orientation with respect to said holding means;

conveying means for moving said holding means securing such a crab body along a predetermined path and proximate a cutting means; and a cutting means for cutting the legs, claws and swimmeret members from both sides of the body of such a crab at an angle and substantially through the knuckles joining such members to the body of a crab and along first and second cutting planes, each of said first and second cutting planes parallel to said predetermined path and converging below the body of said crab, and for further making a "V" cross-sectional shaped cut extending between the front and rear of the crab, the open or top of said "V" shape located at the top or back of the crab and the "tip" of the "V" extending into the crab body and substantially parallel to the center line of the crab body such that the tip of said "V" cut is proximate but does not cut through the belly shell of such a crab thereby separating the "V" cross-sectional shaped portion containing the viscera from said crab body while maintaining the structural integrity of said belly shell such that said crab body is not divided into two pieces.

3. Apparatus for preparing cooked crabs for further processing to separate meat from shell by centrifugal action comprising:

holding means for releaseably securing a cooked crab body which has had the carapace shell removed in a selected orientation with respect to said holding means;

conveying means for moving said holding means securing such a crab body along a predetermined path and proximate a cutting means; a cutting means for making a "V" cross-sectional shaped cut extending between the front and rear of the crab, the open or top of said "V" shape located at the top or back of the crab and a "tip" of the "V" extending into the crab body such that said "tip" of "V" is proximate but does not cut through the belly shell of such a crab thereby separating a "V" cross-sectional shaped portion containing the viscera from said crab body while maintaining the structural integrity of said belly shell such that said crab body is not divided into two pieces; and brush means located proximate said predetermined path, said brush means for detaching and removing gills and other loosely inedible attached parts of such a crab so that that the inner back shell is exposed.

4. The apparatus of claim 2 and further including brush means located proximate said predetermined path, said brush means to detach and remove gills and any other loosely attached inedible parts of such a crab such that the inner back shell is exposed.

5. The apparatus of claim 3 wherein said brush means is located along said predetermined path at a location following said cutting means.

6. Apparatus for preparing cooked crabs for further processing to separate meat from shell by centrifugal action comprising:

holding means for releaseably securing a cooked crab body which has had the carapace shell removed in a selected orientation with respect to said holding means;

conveying means for moving said holding means securing such a crab body along a predetermined path and proximate a cutting means; a cutting means for making a "V" cross-sectional shaped cut extending between the front and rear of the crab, the open or top of said "V" shape located at the top or back of the crab and a "tip" of the "V" extending into the crab body such that said "tip" of "V" is proximate but does not cut through the belly shell of such a crab thereby separating a "V" cross-sectional shaped portion containing the viscera from said crab body while maintaining the structural integrity of said belly shell such that said crab body is not divided into two parts; and means located proximate said predetermined path at a location following said cutting means for directing a stream of water at the portion of said secured crab body where said "V" cross-sectional shaped portion has been removed to remove and further clean fats, roe, loose shell fragments and remaining viscera from said crab body.

7. The apparatus of claim 6 wherein said cutting means further includes means for cutting the legs, claws and swimmeret members from both sides of the body of such a crab at an angle and substantially through the knuckles joining such members to the body of a crab along first and second cutting planes, each of said first and second cutting planes parallel to said predetermined path and converging below the body of said crab.

8. The apparatus of claim 6 wherein said cutting means include means for cutting the legs, claws and swimmeret members from both sides of the body of such a crab and substantially through the knuckles joining such members to the body of a crab, and further including brush means located proximate said predetermined path, said brush means for detaching and removing gills and any other loosely attached inedible parts of such a crab so that the inner back shell is exposed.

9. The apparatus of claims 1, 2 or 3 wherein said conveyor means is a first endless loop conveyor chain or belt.

10. The apparatus of claim 9 wherein said holding means comprises a multiplicity of holding means secured at selected locations along said endless conveyor chain or belt such that a multiplicity of crab bodies may be moving along said predetermined path at one time.

11. The apparatus of claims 1, 2 or 3 wherein said cutting means for making said "V" shaped cut comprises two circular blades having the cutting plane of said blades parallel to said predetermined path and intersecting each other to form the tip so as not to touch each other.

12. The apparatus of claims 5 or 8 wherein said brush means comprises two circular brushes each having their axis of rotation parallel to the predetermined path when said holding means is proximate said brush means.

13. The apparatus of claims 5 or 8 wherein said brush means comprises two circular and parallel brushes spaced a selected distance from each other, and each having their axis of rotation perpendicular to the predetermined path when said holding means is proximate said brush means such that the ends of one brush contacts said crab body on one side where the gills are attached, and the ends of the other brush contact said crab body on the other side where the gills are attached.

14. The apparatus of claims 5 or 8 wherein said brush means comprises a multiplicity of brushes attached to a second endless loop conveyor chain located proximate to and parallel to said conveyor chain or belt when said holding means is proximate said brush means.

15. The apparatus of claims 2, 4, 6 or 7 wherein said cutting means comprises a first set of two circular blades for making said "V" shape cut and a second set of two circular blades for removing the legs, claws and swimmerets of said crab, each one of said first set of circular blades parallel and having a common axis of rotation to one of said second set of circular blades, and the axis of rotation of each blade in each of said first and second sets being located in the same plane.

16. The apparatus of claim 15 wherein said brush means comprises two circular brushes, one each sandwiched between a pair of parallel blades comprised of said first and second sets, and the axis of rotation of said brush also being common with said common axis of rotation of the blades on each side.

* * * * *